United States Patent [19]

Gerrish, Jr.

[11] 4,185,557
[45] Jan. 29, 1980

[54] STRESS REDUCING LINER AND METHOD OF FABRICATION

[75] Inventor: Howard W. Gerrish, Jr., China Lake, Calif.

[73] Assignee: The United States of America as represented by the Secretary of the Navy, Washington, D.C.

[21] Appl. No.: 249,457

[22] Filed: Apr. 28, 1972

[51] Int. Cl.$^2$ ................................. F42B 1/00
[52] U.S. Cl. ................................. 102/103; 149/108.8; 264/3 R
[58] Field of Search ............... 156/278, 279, 280, 334; 117/66, 95, 96, 97, 136, 137, 138; 102/103; 264/3 R; 149/108.8

[56] References Cited

U.S. PATENT DOCUMENTS

| | | | |
|---|---|---|---|
| 2,858,289 | 10/1958 | Bohn et al. | 102/103 X |
| 3,054,253 | 9/1962 | Chung | 102/103 X |
| 3,108,433 | 10/1963 | De Fries et al. | 102/103 X |
| 3,347,047 | 10/1967 | Hartz et al. | 102/103 X |
| 3,362,159 | 1/1968 | Heesacker | 102/103 X |
| 3,426,528 | 2/1969 | Mangum et a. | 102/103 X |
| 3,427,805 | 2/1969 | Osburn | 102/103 X |
| 3,446,018 | 5/1969 | Macbeth | 102/103 X |
| 3,489,714 | 1/1970 | Sayles | 102/103 X |
| 3,578,520 | 5/1971 | Dolan et al. | 102/103 X |
| 3,649,389 | 3/1972 | Barron | 102/103 X |

Primary Examiner—Stephen J. Lechert, Jr.
Attorney, Agent, or Firm—R. S. Sciascia; W. Thom Skeer; L. E. K. Pohl

[57] ABSTRACT

A stress reducing liner for a solid rocket motor comprising a first layer of polybutadiene based material, a second layer of perforated silicone rubber and a third layer of polybutadiene based material is fabricated by (1) coating the inner surface of a rocket motor casing with a curable polybutadiene based first layer material, (2) simultaneously heating and spinning the casing to cure the material in an even layer, (3) placing perforated silicone rubber over the cured first layer, (4) coating the silicone rubber layer with another uncured polybutadiene based material and (5) repeating the simultaneous heating and spinning procedure of step (2).

2 Claims, No Drawings

STRESS REDUCING LINER AND METHOD OF FABRICATION

BACKGROUND OF THE INVENTION

1. Field of the Invention

This invention relates to stress reducing liners for solid rocket propellant motors. More particularly, this invention relates to a method for fabricating stress reducing liners for solid rocket propellant motors and to an improved liner configuration.

2. Description of the Prior Art

The use of stress reducing liners in solid rocket propellant motors is well known. The function of a stress reducing liner is to prevent solid rocket propellant from fracturing or cracking under stresses caused by cure shrinkage, thermal cycling and the like and to provide a means for attaching the propellant to the motor casing. Many liner systems have been used with varying degrees of success but none have completely solved the problems associated with the art. Therefore, a considerable amount of research and development work aimed at producing more reliable liners is still being carried out.

SUMMARY OF THE INVENTION

An improved liner according to this invention comprises three layers. The first layer is a polybutadiene based layer adjacent to the motor casing. The second layer is a perforated silicone rubber layer adjacent to the first polybutadiene based layer. The third layer is another polybutadiene based layer sandwiched between the silicone rubber layer and the solid propellant in the motor. The first layer insulates the motor casing and bonds to it. The third layer provides bonding to the propellant and bonds to the first layer through the perforations in the silicone rubber. The silicone rubber layer provides stress reduction and also acts as an insulating layer.

The method according to this invention involves the steps of: (1) spreading a coating of uncured polybutadiene based material over the inner surface of a motor casing, (2) simultaneously heating and spinning the casing to form a cured, uniform thickness layer, (3) placing a perforated silicone rubber layer over the cured, uniform thickness layer of step (1) and (4) and (5) repeating steps (1) and (2) with another cost of polybutadiene based material. After fabrication is complete, propellant mix may be introduced to the motor and cured by any methods commonly used for that purpose.

DESCRIPTION OF THE PREFERRED EMBODIMENT

To facilitate understanding of the present invention the description of the preferred embodiment is organized to first describe the materials used in the three layers of the preferred three layer stress reducing liner and then describe, in detail, how the three layer liner is fabricated in a rocket motor casing. As stated above, a solid propellant grain may be gotten into a motor casing in any convenient manner once the liner has been fabricated in the casing.

Materials:

First Layer—A preferred first layer mixture according to this invention contains liquid polybutadiene (Butarez CTL), methyl aziridinyl phosphine oxide (MAPO), an epoxide resin having the structure:

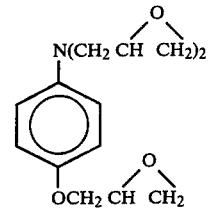

(ERLA 0510), carbon black, cellulose acetate plastic and powdered asbestos. If desired, other fire resistant materials such as Kynol Fiber (a product of carborundum) may be added. One specific mixture tested and found to be suitable has the following composition:

| Component | Wt. % |
| --- | --- |
| Butarez CTL | 73 |
| MAPO | 2 |
| Erla 0510 | 8 |
| C. A. Plastic | 2 |
| Carbon Black | 5 |
| Powdered Asbestos | 10 |
| | 100% |

Second Layer—The second layer of a preferred stress relieving liner according to this invention comprises a perforated sheet of silicone rubber. The perforations may be of any convenient shape, i.e., round, square, triangular, etc.

Perforated sheets fabricated according to the formula $nA_h/A_T = \frac{1}{4}$ where n is the number of perforations, $a_h$ is the area of a perforation and $A_T$ is the total sheet area have been tested and found to give excellent results with solid propellant grains about 7 inches in diameter and about 50 inches long. The relative magnitudes of n and $A_h$ (whether n is large and $A_h$ is small or visa versa) appear to make little difference. Nor should the number $\frac{1}{4}$ be taken as an optimum. For larger grains it might be desirable to increase the value of $nA_h/A_T$ to provide for increased stress. On the other hand, for smaller grains it might be desirable to decrease the value of $nA_h/A_T$.

A suitable procedure for getting a perforated silicone rubber layer into a rocket motor adjacent to a cured first layer is described below.

Third Layer—A preferred third layer mix according to this invention contains the same components in the same weight percentages as a first layer mixture described above.

Method:

Step (1)—The first step of the method according to this invention involves preparing a suitable first layer mixture (for composition see First Layer under Materials) and coating the inner surface of a rocket motor casing with the vicous uncured but curable mixture. Coating may be accomplished by means of a paint brush, roller, sprayer, ect. or any other suitable means.

Step (2)—After applying the coating, the casing is simultaneously heated and spun. Heating and spinning may be accomplished by means of any suitable equipment commonly used for those purposes. It is preferable to spin the casing at a slow rate of speed at the beginning of the heating and spinning procedure, i.e., about 25 to 35 rpm and use a trowel rod to insure a uniform thickness coating. At the same time a temperature suitable for curing the coating is applied. For the mixture described above a temperature in the range of from about 175° to about 185° F. is suitable. After the coating appears to be of uniform thickness the trowel rod is removed and the spinning rate is increased to from about 275 to about 325 rpm. This rate, along with a temperature in the above-defined suitable range, is then maintained for about 16 to 20 hours.

Step (3)—After completion of step (2) a perforated sheet of silicone rubber is placed over the cured polybutadiene based first layer and pressed firmly down. The sheet joint (longitudinal line through the casing where the ends of the sheet abut against one another) is then sealed with silicone adhesive. This insures that the perforated silicone rubber sheet will remain in place during subsequent procedures.

Step (4)—The fourth step of a method according to this invention is a repeat of step (1) with the exception that the polybutadiene based coating is applied to the perforated silicone rubber sheet of step (3) rather than to the motor casing. Enough material must be applied to penetrate and fill the perforations in the silicone rubber sheet as well as provide a continuous uniform thickness layer inside the sheet.

Step (5)—The fifth step of a process according to this invention is a repeat of step (2) above with the exception that the layer being uniformly thickened and cured is on the inner surface of the silicone rubber sheet rather than on the inner surface of the motor casing.

While a specific composition for the polybutadiene based layers of rocket motor liners according to this invention is given above, it should be obvious that a wide range of materials and quantities thereof could be used in lieu of the one specified. It should further be obvious that it is preferable to begin the operations involved in the method of this invention with a motor having a properly cleaned and primed inner surface. Also, while silicone rubber is specified above as the middle layer of the three layer liner, other materials which will not bond to the other two layers and which are soft enough not to shear the other two layers under stress may be used in lieu of silicone rubber.

Liners according to this invention are particularly useful with end burning propellant grains but may be used with other types of solid propellant grains as well. They are advantageous in that fabrication does not require pressure curing of any of the components, they distribute stresses more evenly over the propellant grain/liner interface than previously used liner systems, and they allow for peripheral pressurization of the grain.

I claim:

1. A method of fabricating a stress reducing liner for a solid propellant rocket motor, said method comprising the steps of:
   (a) coating the inner surface of a rocket motor casing with a first curable polybutadiene based mixture;
   (b) simultaneously heating and spinning the casing to cause said first polybutadiene based mixture to cure in an even layer on the inner surface thereof;
   (c) covering the cured polybutadiene based layer with a sheet of solid silicone rubber which has been perforated and which is sized to fit the inner surface of said rocket motor casing;
   (d) coating the inner surface of the layer of perforated silicone rubber with a second curable polybutadiene based mixture; and
   (e) simultaneously heating and spinning the casing to cause the second polybutadiene based mixture to cure in an even layer on the inner surface of the silicone rubber layer and bond to the first polybutadiene based layer by means of columns through said perforations in the silicone rubber layer.

2. A method according to claim 1 wherein said first and second curable polybutadiene based mixtures contain about 73 weight percent polybutadiene,
about 2 weight percent methyl aziridinyl phosphine oxide,
about 8 weight percent of a compound having the formula:

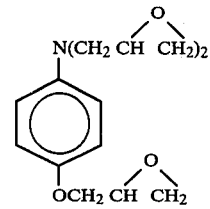

about 2 weight percent cellulose acetate plastic,
about 5 weight percent carbon black, and
about 10 weight percent powdered asbestos.

* * * * *